G. B. SMITH.
WIRE MATTRESS.
APPLICATION FILED FEB. 13, 1908.
909,244.
Patented Jan. 12, 1909.
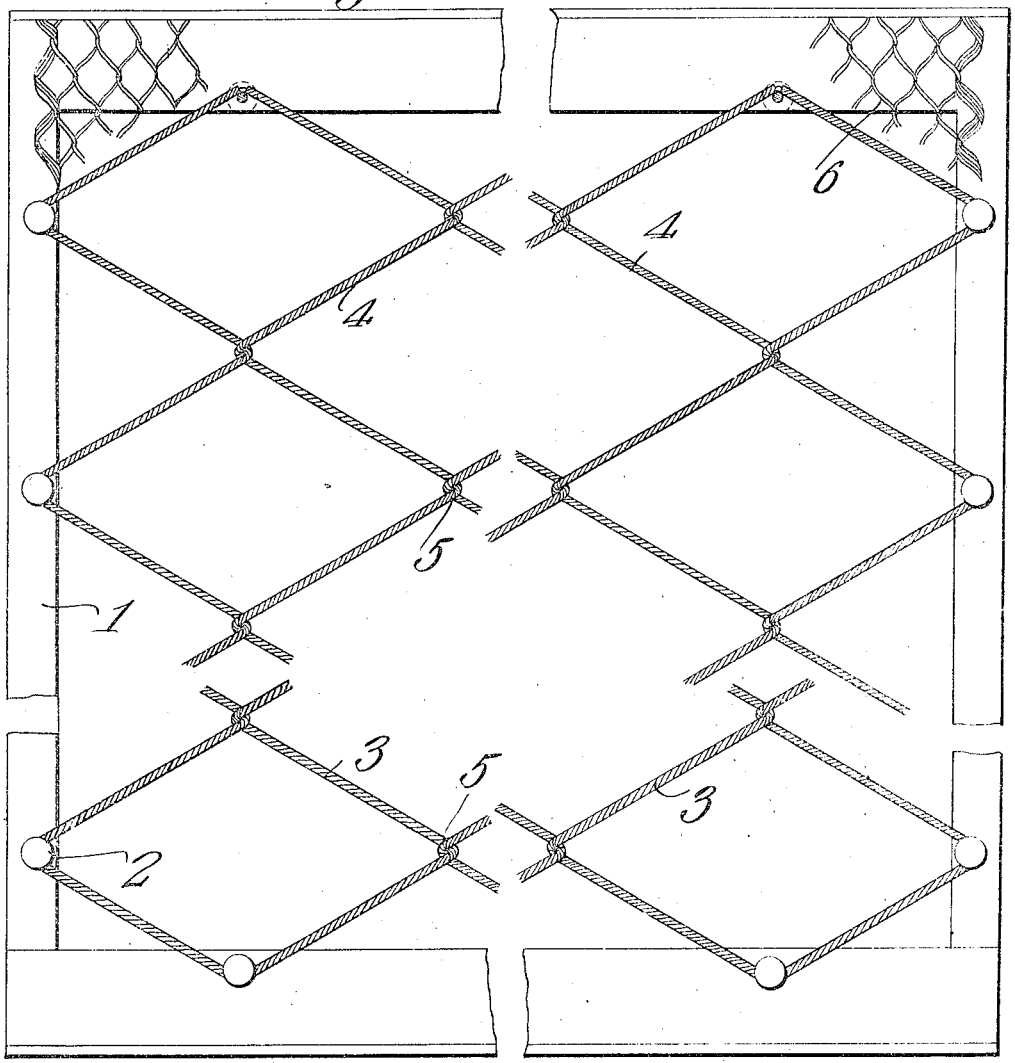
Witnesses 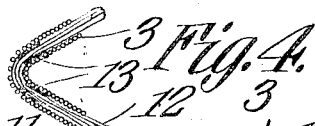
Inventor
Gary B. Smith.
By 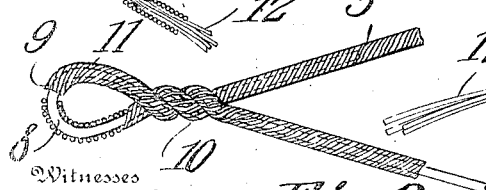
Attorneys

UNITED STATES PATENT OFFICE.

GARY B. SMITH, OF ANOKA, MINNESOTA.

WIRE MATTRESS.

No. 909,244.  Specification of Letters Patent.  Patented Jan. 12, 1909.

Application filed February 13, 1908. Serial No. 415,774.

*To all whom it may concern:*

Be it known that I, GARY B. SMITH, a citizen of the United States, residing at Anoka, in the county of Anoka and State of Minnesota, have invented a new and useful Wire Mattress, of which the following is a specification.

This invention has relation to wire mattresses and it consists in the novel construction and arrangement of its parts as hereinafter shown and described.

The object of the invention is to provide a structure of the character indicated consisting of a supporting frame having a series of continuous endless cables each formed into a chain of rhombic sections with the apices of the obtuse angles disposed longitudinally of the same and the acute sides of the chain of sections passing within and engaging at their apices similar sides of the next adjacent chain of sections and vice versa. By such a structure the continuous endless cables maintain their shape and relative arrangement for an indefinite length of time in as much as one cable engages the other at the apices of the acute sides of the sections, consequently, the cable sections are not liable to pull or move with relation to each other and lose their rhombic configuration.

A further object of the invention is to provide a peculiar and an efficient means for joining the ends of the cables together whereby continuous cables are formed. The said means is so located as to be practically concealed within the cable and upon a casual observation does not break or interfere with the continuous appearance of the texture of the cable.

In the accompanying drawing: Figure 1 is a plan view of a mattress with parts broken away. Fig. 2 is a plan view of one form of means for connecting the ends of a cable together. Fig. 3 is a perspective view of another form of means for connecting the ends of a cable together, and Fig. 4 is a sectional view of the form of means shown in Fig. 2.

The mattress consists of the rectangular frame 1 which is provided at suitable intervals along its sides with the pegs or retainers 2. The cables 3 are continuous and endless. That is to say, their ends are joined together as will hereinafter appear. Each cable is formed into a series of rhombic sections 4 which sections have the apices of the obtuse angles disposed in alinement longitudinally of the chain and the acute sides of the chain section pass within and engage at their apices similar sides of the next adjacent chain of sections and vice versa as at points 5. Thus the sections of one chain are connected with the sections of the next adjacent chain at their acute angles and consequently the parts are so disposed as to brace each other with a decided tendency to prevent the sections from losing their rhombic configuration. The wire fabric 6 lies over the frame 1 and the cables 3.

Two forms of means are shown for the purpose of connecting the ends of the cables 3 together to render the same continuous. In the form shown in Fig. 2 which is located at one of the acuminate ends of one of the rhomb sections a wire 8 is inserted in the ends of the cable 3 so that the extremities of the said cable abut against each other or nearly so as at 9. As the cable 3 is made up of a series of wires helically twisted together the said cable is hollow and will readily receive the wire 8. At the point 10 the wire 8 and the end portions of the cable 3 are twisted upon themselves which distorts the cable section slightly out of its true rhombic configuration although it maintains such a configuration generally. The said twist 10 also binds the wire 8 in the end portions of the cable 3 but not directly at the extremities of the ends thereof and a loop is formed as at 11 which may receive one of the pegs 2 or an acuminate end of an adjacent rhombic section.

In the form of means illustrated in Figs. 3 and 4 several wires 12 are inserted in the end portions of the cable 3 and the said wires 12 are attached to the inner sides of the wires 3 by means of solder as at 13 in Fig. 4. Several wires 12 are used in order to present sufficient surface for the solder to effectually engage. In this form the twist 10 and loop 11 shown in Fig. 2 are dispensed with but in both of the forms of end connecting means the means for fixing the bonding wire or wires with relation to the end portions of the cable are not located directly at the extreme ends of the cable nor do they bridge from one of the cables to the other but are located at points remote or away from the ends of the cable but at end portions of the same. By such means for connecting the ends of the cable together the resiliency of the cable is not detracted from as the connecting means (which is necessarily more rigid) is located at points where resiliency is not required or where the used connection between one rhombic section and another would compensate for any resiliency lost by providing such end connecting means.

Having described my invention, what I claim as new and desire to secure by Letters Patent is:

1. In a structure of the character indicated, a hollow cable having approximately abutting ends with converging end portions, a wire having diverging end portions inserted in the converging end portions of the cable and bridging the space between the ends of the cable and means for fixing the wire with relation to the end portions of the cable, which means is located in the vicinity of the end portions of the cable but spaced from the extremities thereof.

2. In a structure of the character indicated, a hollow cable having approximately abutting ends with portions extending in different directions, a wire inserted in the end portions of the cable and bridging the space between the ends of the cable, said wire and the end portions of the cable being twisted at a point removed from the extremities of the cable.

In testimony that I claim the foregoing as my own, I have hereto affixed my signature in the presence of two witnesses.

GARY B. SMITH.

Witnesses:
A. M. STEWART,
J. H. NILES.